(12) United States Patent
Aftab et al.

(10) Patent No.: US 8,326,279 B2
(45) Date of Patent: *Dec. 4, 2012

(54) UTILIZING MOBILE DEVICE FUNCTIONALITY FROM REMOTE COMPUTERS

(75) Inventors: Omar Aftab, Kirkland, WA (US); Syed Mansoor Jafry, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,867

(22) Filed: Dec. 13, 2011

(65) Prior Publication Data

US 2012/0094647 A1    Apr. 19, 2012

Related U.S. Application Data

(63) Continuation of application No. 12/029,567, filed on Feb. 12, 2008, now Pat. No. 8,081,963.

(51) Int. Cl.
 *H04M 3/00* (2006.01)
(52) U.S. Cl. .................. 455/419; 455/420; 455/466
(58) Field of Classification Search .................. 455/419, 455/557, 466
 See application file for complete search history.

(56) References Cited

U.S. PATENT DOCUMENTS

| | | | |
|---|---|---|---|
| 6,741,855 | B1 | 5/2004 | Martin et al. |
| 7,020,685 | B1 | 3/2006 | Chen et al. |
| 7,149,813 | B2 | 12/2006 | Flanagin et al. |
| 7,203,505 | B1 | 4/2007 | Larikka et al. |
| 7,254,614 | B2 | 8/2007 | Mulligan et al. |
| 7,277,726 | B2 | 10/2007 | Ahya et al. |
| 8,081,963 | B2 | 12/2011 | Aftab |
| 2003/0139175 | A1* | 7/2003 | Kim .............................. 455/419 |
| 2004/0204070 | A1 | 10/2004 | August et al. |
| 2005/0055416 | A1 | 3/2005 | Heikes et al. |
| 2005/0260989 | A1 | 11/2005 | Pourtier et al. |
| 2005/0288044 | A1 | 12/2005 | Atkins et al. |
| 2006/0112339 | A1 | 5/2006 | Struthers et al. |
| 2006/0224750 | A1 | 10/2006 | Davies et al. |
| 2007/0083600 | A1 | 4/2007 | Bakos et al. |
| 2007/0112880 | A1 | 5/2007 | Yang et al. |
| 2007/0260673 | A1 | 11/2007 | Shenfield et al. |

(Continued)

FOREIGN PATENT DOCUMENTS

KR    1020010111523    12/2001

(Continued)

OTHER PUBLICATIONS

"Final Office Action", U.S. Appl. No. 12/029,567, (Jun. 10, 2011), 6 pages.

(Continued)

*Primary Examiner* — Charles Shedrick
(74) *Attorney, Agent, or Firm* — Wolfe SBMC

(57) ABSTRACT

Various technologies and techniques are disclosed for utilizing mobile device information and functionality from separate computing devices. A synchronization operation is performed to update a data store with communication information from a mobile device. The synchronization operation is performed wirelessly with the mobile device. A user of a separate computing device can access the communication information stored in the data store separately from the mobile device. The user of the separate computing device can remotely initiate operations on the mobile device from the separate computing device. For example, the user can initiate the sending of text messages through the mobile device from the separate computing device. As another example, the user can initiate the placing of a telephone call through the mobile device from the separate computing device.

20 Claims, 14 Drawing Sheets

U.S. PATENT DOCUMENTS

2007/0288662 A1 12/2007 Chen et al.
2008/0003996 A1 1/2008 Strandell et al.
2009/0203402 A1 8/2009 Aftab et al.

FOREIGN PATENT DOCUMENTS

| KR | 1020040037795 | 5/2004 |
|----|---------------|--------|
| KR | 100691861 | 2/2007 |

OTHER PUBLICATIONS

"International Search Report and Written Opinion", PCT/US2008/088458, (Jun. 3, 2009), 10 Pages.

"Non-Final Office Action", U.S. Appl. No. 12/029,567, (Oct. 6, 2010), 10 Pages.

"Notice of Allowance", U.S. Appl. No. 12/029,567 (Aug. 19, 2011), 4 pages.

"Zimbra Collaboration Suite Mobility", http://www.zimbra.com/products/zimbra_mobile.html, 1 Page.

De Herrera, Chris "Setting Up Exchange 2003 to Synchronize with Windows Mobile", http://pocketpcmag.com/_archives/Apr06/directions.aspx, (Apr. 2006), 3 Pages.

Guerrero, Carlo "Synchronization: SMS Sync 4 Outlook by V2R released", http://www.theunwired.net/?itemid=1870, (Aug. 4, 2004), 2 Pages.

\* cited by examiner

UTILIZING MOBILE DEVICE FUNCTIONALITY FROM REMOTE COMPUTERS

RELATED APPLICATIONS

This application is a continuation of and claims priority under 35 U.S.C. §120 to U.S. patent application Ser. No. 12/029,567, filed on Feb. 12, 2008 and titled "Utilizing Mobile Device Functionality from Remote Computers," the disclosure of which is incorporated by reference in its entirety herein.

BACKGROUND

In today's world of technology, a variety of mobile devices can be used by people on the go. Some examples of mobile devices include personal digital assistants (PDAs), wireless phones, PDA phones, laptops, vehicle devices, and embedded devices, to name a few examples. Some mobile devices are used for placing telephone calls, accessing personal information, sending text messages and emails, and sometimes even for connecting to corporate network applications remotely. Many mobile devices have wireless capability which enables people to send messages while on the go. For example, SMS text messages and/or emails can be sent from many cell phones and PDA phones.

With the increasing mobility of society, these mobile devices are becoming more frequently used to replace functionality that used to be provided in office environments. Some phone systems, for example, will route an incoming call to a person's office phone first, to a person's mobile phone next, and so on until the person is located. In some cases, the mobile phone is the only phone used by a person on a regular basis.

Furthermore, a person may enter data into a mobile device that is related to information stored in other systems. For example, if the user enters an appointment into the mobile device, that data does not automatically make it to the user's calendar at work unless a synchronization operation is initiated. Typical synchronization operations require the mobile device to be tethered with a USB or other cable, or in close proximity to a computer performing synchronization in order for a wireless connection to be established.

When a user has forgotten to perform this synchronization, or when the user is otherwise away from the mobile device, there is valuable communication information along with mobile-device specific features that the user is unable to access and/or utilize.

SUMMARY

Various technologies and techniques are disclosed for utilizing mobile device information and functionality from separate computing devices. A synchronization operation is performed to update a data store with communication information from a mobile device. The synchronization operation is performed wirelessly with the mobile device. A user of a separate computing device can access the communication information stored in the data store separately from the mobile device. The user of the separate computing device can remotely initiate operations on the mobile device from the separate computing device.

In one implementation, a method for initiating the sending of a text message through a mobile device from a separate computing device is described. Message details are received for a text message. The message details were input by a user of a separate computing device. The text message is placed in a server-side outbox. The text message is synchronized down to an outbox of the mobile device over a wireless connection of the mobile device, thereby causing the text message to be sent by the mobile device.

In another implementation, a method for initiating remote dialing through a mobile device using a separate computing device is described. Input is received from a user of a separate computing device to identify a telephone number to call through a mobile device. A connection is established with the mobile device, and a dialing process initiated on the mobile device to place a call a third party. A connection is maintained with the mobile device and the separate computing device simultaneously. One or more data packets are received from the mobile device for transmission to the separate computing device. The data packet(s) from the mobile device contain a spoken voice of the third party. One or more data packets are sent to the mobile device for transmission to the third party. The data packet(s) sent to the mobile device contain a spoken voice of the user of the separate computing device. The data packets continue to be transmitted back and forth until the call terminates.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that allows mobile device functionality and/or information to be utilized and/or accessed from separate computing devices, but the technologies and techniques also serve other purposes in addition to these. In one implementation, one or more of the techniques described herein can be implemented as features within a synchronization program such as MICROSOFT® AirSync, from a communications and information management program such as MICROSOFT® Outlook Web Access (OWA) or MICROSOFT® Office OUTLOOK®, or from any other type of program or service that performs synchronization with mobile devices or otherwise uses information from mobile devices.

In one implementation, some or all of the techniques can be used herein to enable a user to access functionality of a mobile device from a separate computer wirelessly. As one non-limiting example, the user can use a separate computer to view and respond to short message service (SMS) messages of the mobile device. As another non-limiting example, the user can access a missed call history and/or overall call history of a mobile device wirelessly using a separate computer. As yet another non-limiting example, the user can initiate a call from a separate computer that gets placed wirelessly through the mobile device, even when the mobile device is physically located in another county or location from the user. The technologies and techniques that enable these features are described in further detail in FIGS. 1-12.

Figure 1:
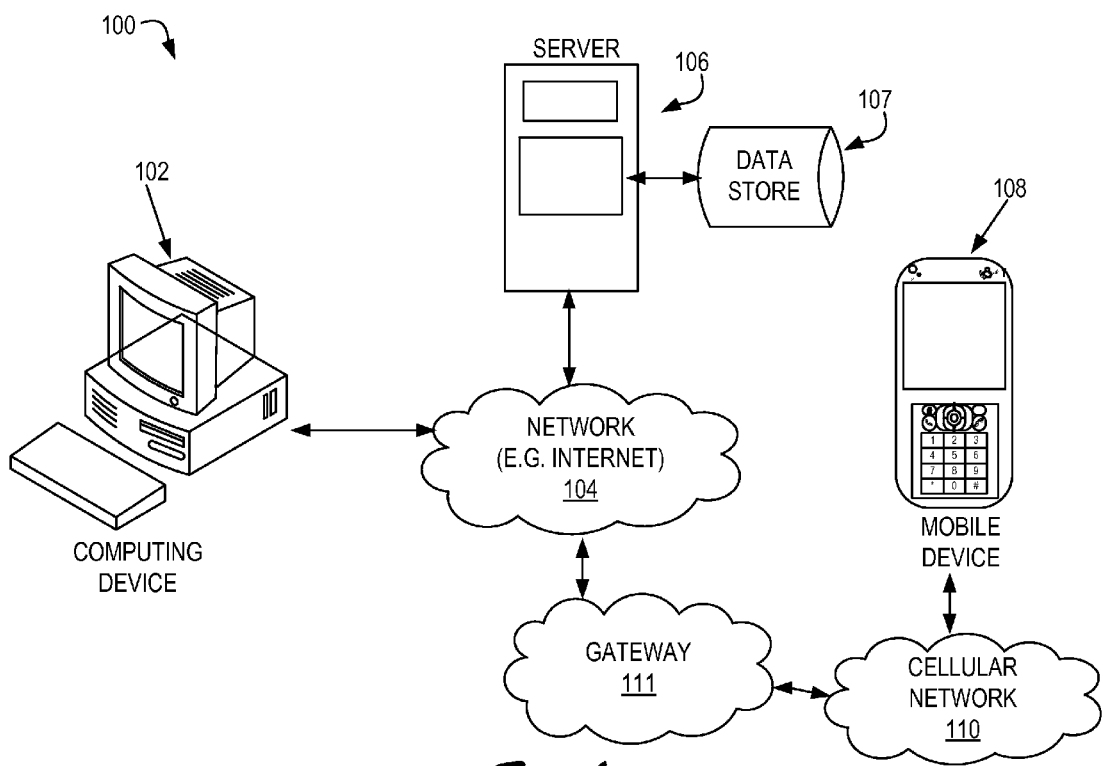
FIG. 1 is a diagrammatic view of a mobile device communication system of one implementation.

FIG. 1 is a diagrammatic view of a mobile device communication system 100 of one implementation. In one implementation, mobile device communication system 100 enables a mobile device 108 to act as a communications server that exposes numerous features to separate computing devices, such as computing device 102 and server 106. Computing device 102 and server 106 are coupled to network 104 over a wired or wireless connection. Network 104 can be one of various types of networks, such as the Internet, a wide area network (WAN), local area network (LAN), or various other types of wired or wireless networks. Mobile device 108 is coupled to a cellular network 110 in a wireless fashion. Cellular network 110 is a network responsible for delivering messages to and receiving messages from mobile devices. Cellular network 110 may include both wireless and wired components, however. For example, cellular network 110 may include a cellular tower that is linked to a wired telephone network. Typically, the cellular tower carries communication to and from mobile devices.

Gateway 111 is responsible for routing messages between cellular network 110 and network 104. For example, server 106 may send data addressed to mobile device 108 through gateway 111. Gateway 111 provides a means for transporting the message from the network 104 to cellular network 110. Conversely, a user with a mobile device connected to cellular network 110 may be accessing the Internet. Gateway 111 allows HTTP and other messages to be transferred between cellular network 110 and network 104.

In one implementation, server 106 is responsible for performing a synchronization operation that synchronizes changes made between a mobile device 108 and a data store 107 that is stored on server 106 or some other computing device that is separate from mobile device 108. In one implementation, the synchronization operation is bi-directional, meaning that changes are synchronized in both directions at some point in time. In a bi-directional synchronization scenario, when changes occur to data on the mobile device, the data store 107 is updated at some point in time to have the updated information. Similarly, when changes occur to the device's data when a user accesses the mobile device functionality from computing device 102 (or server 106), then the data store 107 is synchronized with the mobile device 108 so that the mobile device 108 contains the updated information.

In one implementation, data store 107 can include short message service (SMS) text messages, multimedia message service (MMS) messages that include a text message and/or one or more multimedia objects (such as a photo), missed call history, overall call history, voice messages, email messages, calendar, contacts, tasks, and/or numerous types of information that are provided from mobile device 108 and/or other sources. This synchronization is performed wirelessly with mobile device, although server 106 may have a wired or wireless connection as described earlier. It is the mobile device that has a wireless connection to network 104, so any references herein to wireless communications with the mobile device are referring to this fact, and is not referring to whether or not the computing device 102 or server 106 have a wired or wireless connection with network 104.

In one implementation, the synchronization operation is initiated periodically by server 106, such as on a scheduled basis as specified in some user-defined or administrator-defined setting. In another implementation, the synchronization operation is initiated by server 106 when the user initiates a feature of mobile device 108 remotely from computing device 102. Alternatively or additionally, the synchronization operation can be initiated by server 106 upon request from computing device 102 to access information from mobile device 108. In yet another implementation, the synchronization operation is initiated by the mobile device 108 periodically, such as when information on the mobile device 108 changes. These synchronization scenarios are described in further detail in FIGS. 2-13 herein.

A user can utilize a separate computing device, such as computing device 102, to access the information stored in data store 107 that came from mobile device 108 and/or other locations. For example, the user could access a list of calls that were missed on the mobile device while away from the mobile device, as described in FIG. 7. In such a scenario, computing device 102 would have an application that communicates with server 106 or directly with data store 107 to retrieve the information from data store 107 that was synchronized from mobile device, as described in FIG. 6. The application on computing device 102 that displays information from the mobile device can also include information from other locations, such as office phones, office email, and so on. In this example, the application can be a unified messaging or communication system that brings together information and messages from multiple locations, including wirelessly synchronized data from one or more mobile devices.

Numerous other features of mobile device 108 can also be accessed and/or initiated by computing device 102, such as the creation and/or response to SMS and/or MMS messages that were directed to the mobile device. As described in further detail in the processes of FIGS. 3-5, SMS messages and/or MMS messages can be initiated from computing device 102, yet sent through mobile device 108 (even while mobile device 108 is at a separate location from computing device 102). As described in further detail in FIG. 8, telephone calls can be initiated from computing device 102 and then dialed through mobile device 108, even if mobile device 108 is located separately from computing device 102.

Additional examples and details will be provided in the following figures to illustrate how mobile device 108 can act as a communications server offering remote access to certain features and/or for how mobile device 108 can wirelessly synchronize data with server 106 for access from one or more other computing devices (such as computing device 102).

Turning now to FIGS. 2-8, the stages for implementing one or more implementations of mobile device communication system 100 are described in further detail. In some implementations, the processes of FIG. 2-8 are at least partially implemented in the operating logic of computing device 500 (of FIG. 14).

Figure 2:
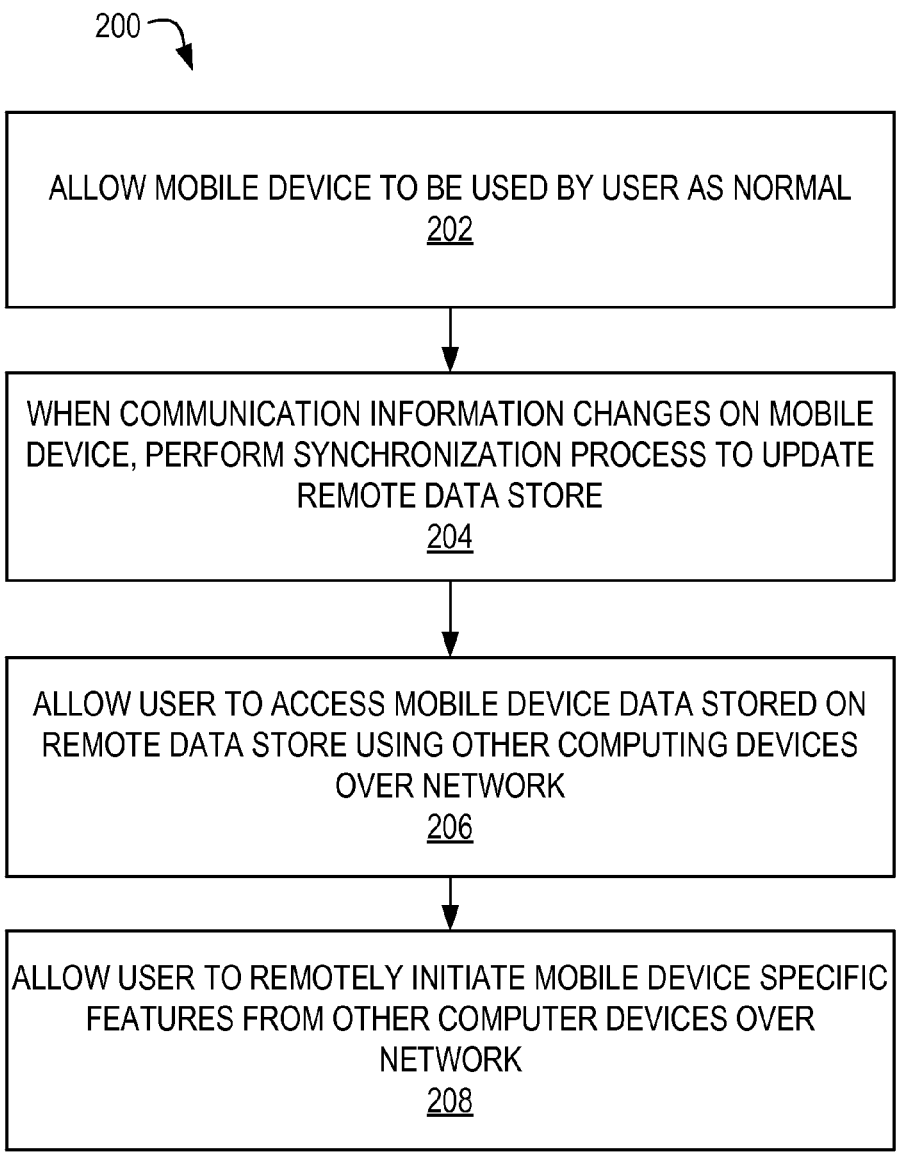
FIG. 2 is a process flow diagram for one implementation illustrating the stages involved in using mobile device specific features from other computing devices.

FIG. 2 is a process flow diagram 200 that illustrates one implementation of the stages involved in using mobile device specific features from other computing devices. The mobile device can be used by a user as normal (stage 202). When certain communication information changes on a mobile device, a server synchronizes data on the mobile device (108 on FIG. 1) with a remote data store (107 on FIG. 1) over the network (stage 204). Some non-limiting examples of the types of communication information that get synchronized include SMS messages, MMS messages, missed call history, and/or complete call history. As described earlier, the synchronization operation can be initiated by the server in response to a period of time passing upon which new data is requested, upon request by the server when a user wants to initiate functionality on the mobile device remotely from a separate computing device, upon request from the mobile device because data has changed, and/or upon request from a computing device that wants to access current information of the mobile device.

The user is able to access mobile device data stored on a server using other computing devices over the network (stage 206). In other words, upon request from a client application on a computing device, the server can respond with data from the data store that displays the most current information from the mobile device. By enabling the user to view and access information from the mobile device that is now contained in the remote data store (as a copy), the user can keep up with the communication activities that have occurred on the mobile device even when away from the mobile device. Alternatively or additionally, the user can remotely initiate one or more mobile device specific features from other computing devices over the network (stage 208). One non-limiting example of the remote initiation of features on the mobile device includes the creation and/or response of SMS/MMS messages on the computing device that gets initiated from the computing device. Another non-limiting example includes the initiation of telephone calls from the computing device that then get routed and dialed from the mobile device. These various scenarios will now be described in further detail in the processes and simulated screens that follow.

Figure 3:
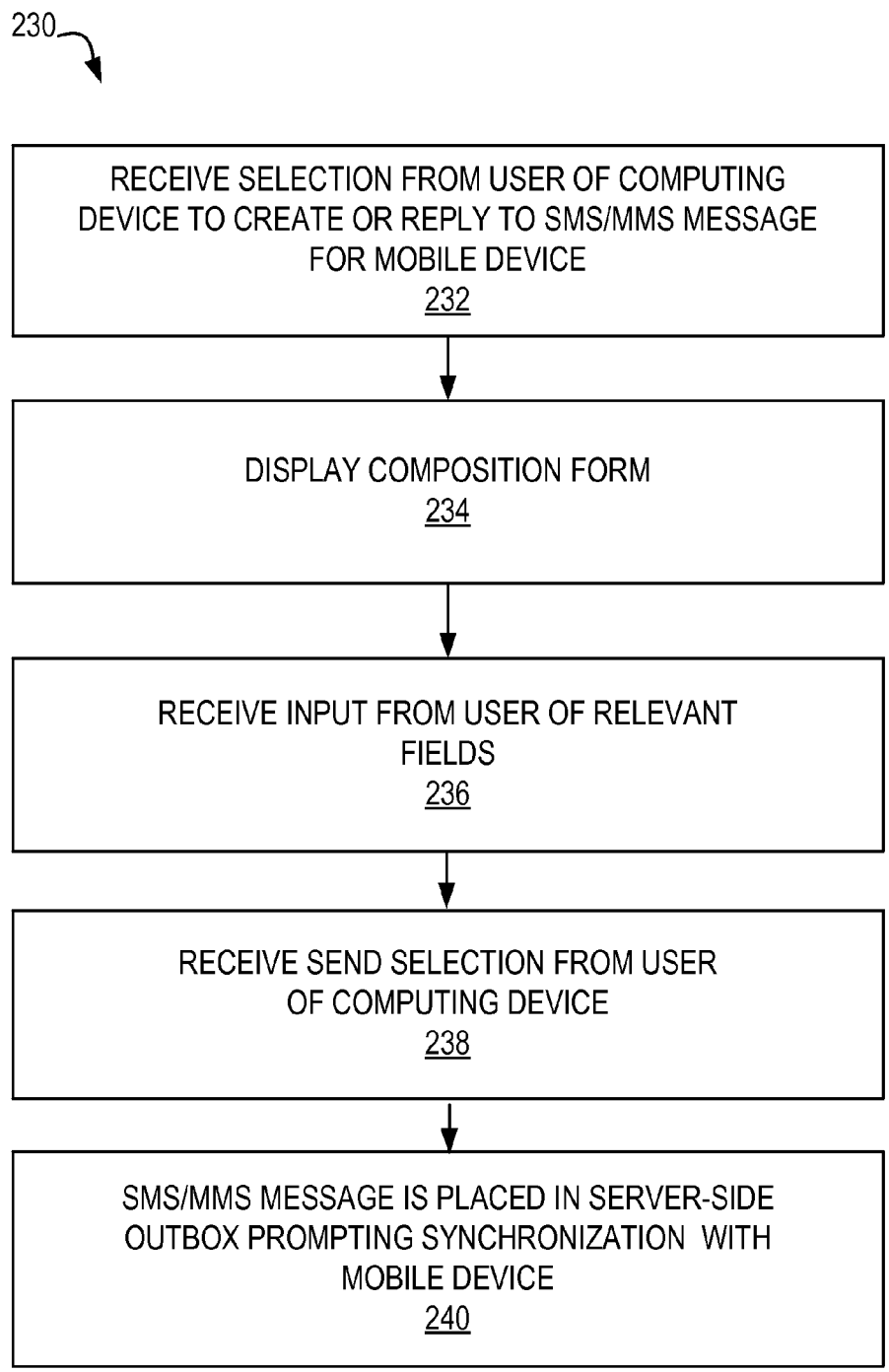
FIG. 3 is a process flow diagram for one implementation illustrating the stages involved in enabling a user to create and reply to SMS/MMS messages for a specific mobile device from a separate computing device.

FIG. 3 is a process flow diagram 230 that illustrates one implementation of the stages involved in enabling a user to create and reply to SMS and/or MMS messages for a specific mobile device from a separate computing device. A selection is received from a user of a computing device to create or reply to an SMS and/or MMS message that was sent to a mobile device (stage 232). One or more composition forms are displayed to the user of the computing device to allow the user to create a new message or a response to an existing message (stage 234). Input is received from a user to fill in the relevant fields on the one or more composition forms (stage 236), such as the phone number of the other device to which the SMS message is directed, and the text of the message. In other words, using a totally separate computer from the mobile device, the user can type up a message that will later be sent as an SMS text message and/or MMS multimedia message directly from the mobile device. Once the user is finished entering information into the composition form(s), a send selection is received from the user of the computing device (stage 238). The SMS and/or MMS message is placed in a server-side outbox, thereby prompting synchronization with the mobile device (stage 240), which is described in further detail in FIG. 4.

Figure 4:
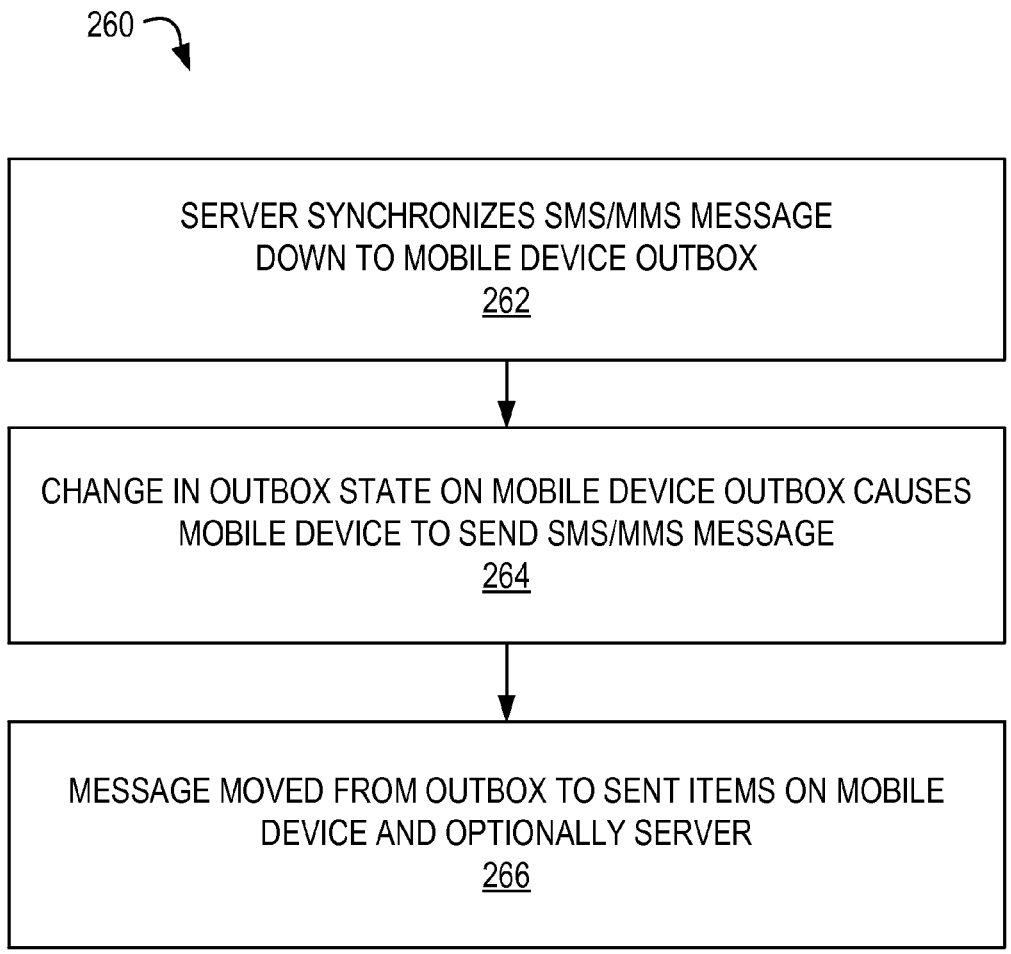
FIG. 4 is a process flow diagram for one implementation illustrating the stages involved in a server synchronizing a SMS/MMS message down to the mobile device for sending.

FIG. 4 is a process flow diagram 260 that illustrates one implementation of the stages involved in a server synchronizing an SMS message and/or /MMS message down to the mobile device for sending. The server synchronizes the SMS message and/or MMS message down to a respective outbox on the mobile device (stage 262). This change in outbox state on the mobile device's outbox causes the mobile device to send the SMS and/or MMS message (stage 264), just as if the user had typed the message directly on the device. The sent message is then moved from the respective outbox folder on the mobile device to the respective sent items folder on the mobile device and optionally the server (stage 266). In other words, the synchronization with the server can be performed right after the state of the sent items or other folder has changed, or at a later scheduled time. The end result of the processes described in FIGS. 3 and 4 is that the user was able to compose an SMS message and/or MMS message for a target recipient using a separate computing device, but the message actually got sent to the target recipient from the mobile device itself.

Figure 5:
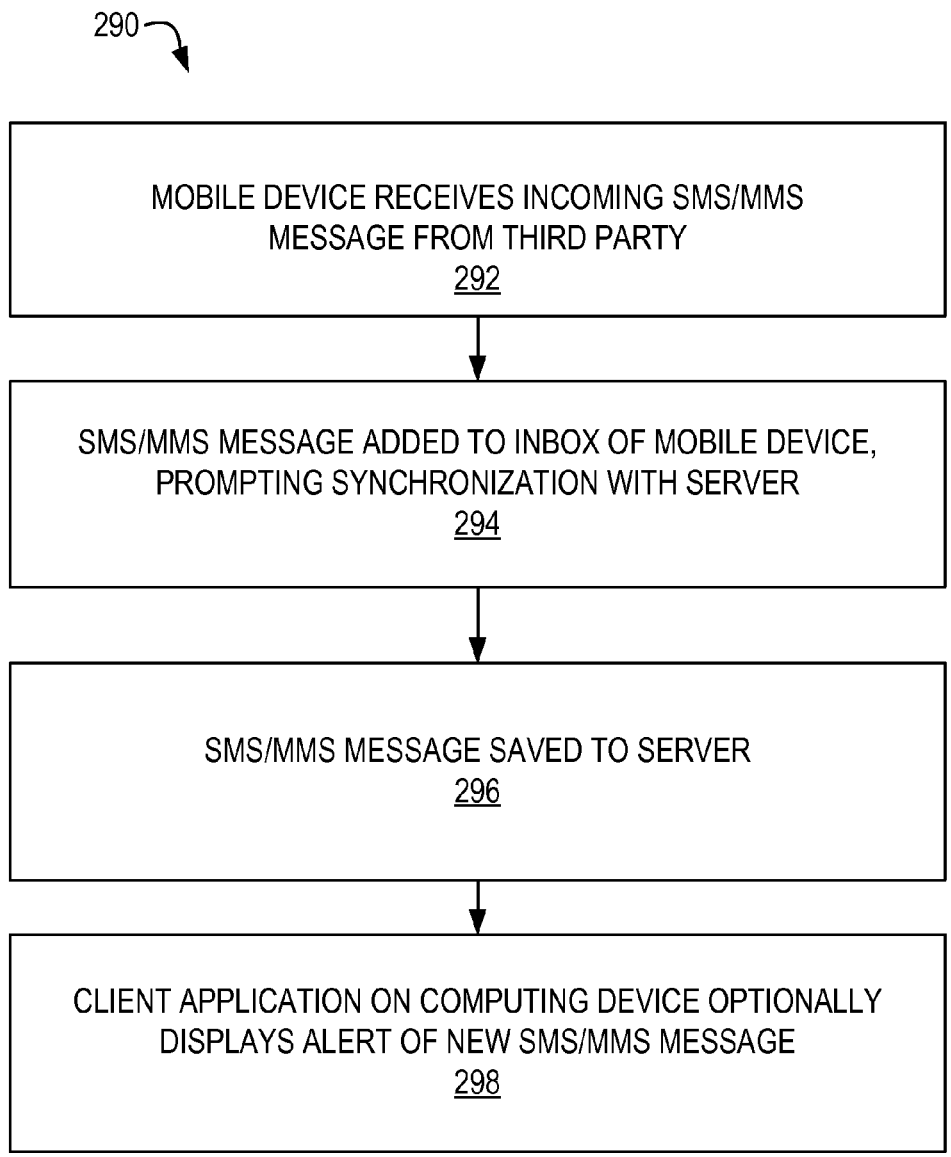
FIG. 5 is a process flow diagram for one implementation illustrating the stages involved in synchronizing data on a server with SMS/MMS messages received on a mobile device.

Turning now to FIG. 5, a process flow diagram 290 is shown that illustrates one implementation of the stages involved in synchronizing data on a server with incoming SMS messages and/or MMS messages received on a mobile device. The mobile device receives one or more incoming SMS messages and/or MMS messages from a third party (stage 292). The SMS message and/or MMS message is added to the respective inbox of the mobile device, thereby prompting synchronization with the server (stage 294). Upon synchronization, the SMS message and/or MMS message is saved to the data store of the server (stage 296). A client application on a computing device optionally displays an alert of the new SMS message(s) and/or MMS message(s) (stage 298).

Figure 6:
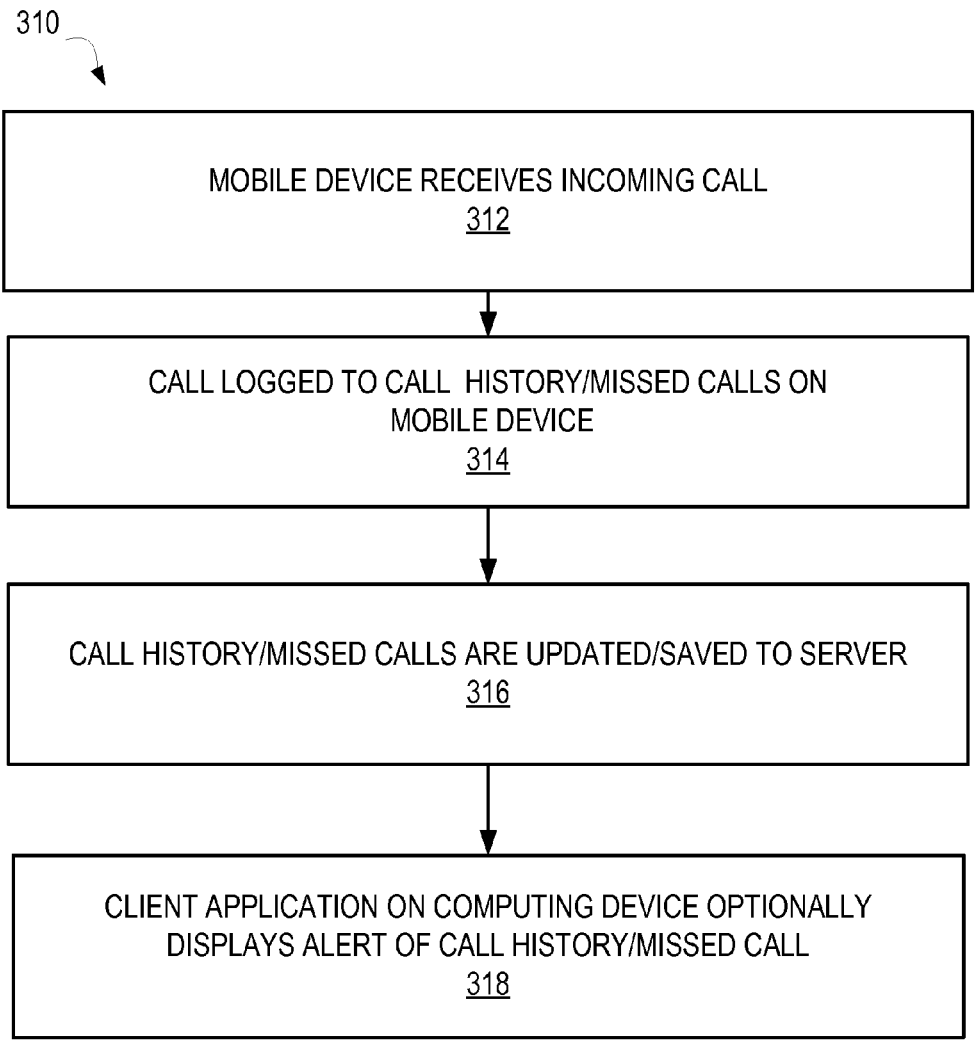
FIG. 6 is a process flow diagram for one implementation illustrating the stages involved in synchronizing an incoming call history and/or a missed call history on a mobile device with a server for enabling user access to the data separately from the mobile device.
Figure 13:
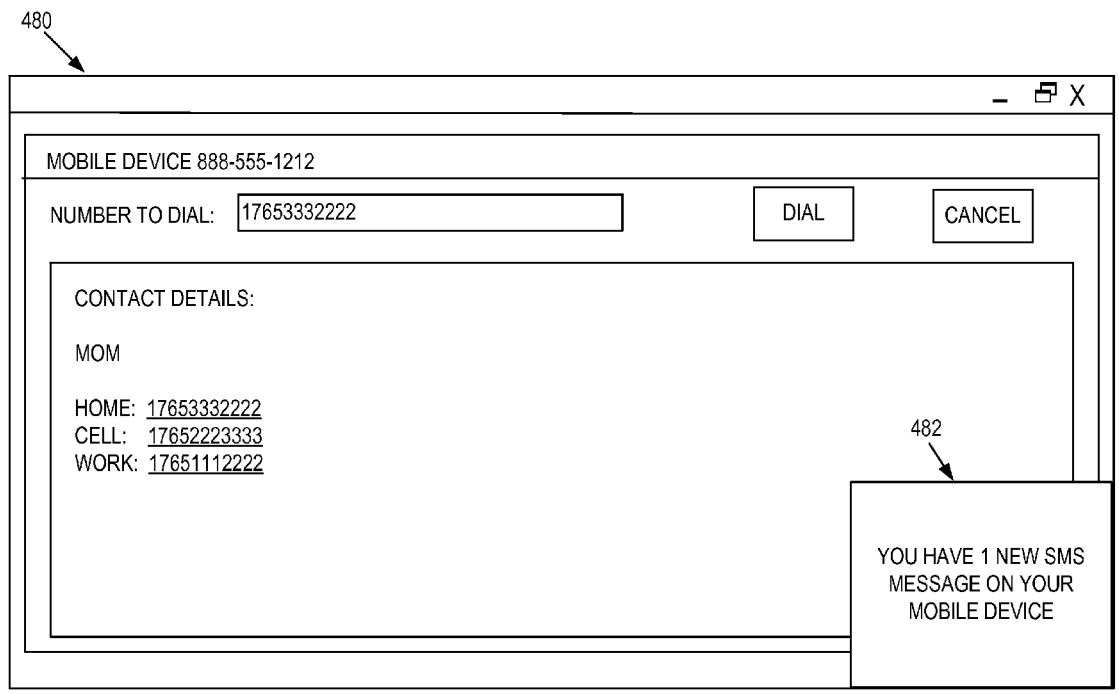
FIG. 13 is a simulated screen for one implementation that illustrates the displaying of an alert to the user in whatever program they are working in to indicate that a new message has arrived on the mobile device.

FIG. 6 is a process flow diagram 310 that illustrates one implementation of the stages involved in synchronizing an incoming call history and/or a missed call history on a mobile device with a server for enabling user access to the data separately from the mobile device. The mobile device receives incoming call (stage 312). The call is logged to an overall call history, and to a missed calls list if the call was not answered on the mobile device (stage 314). The call history list and/or missed calls list is saved and/or updated on the data store of the server (stage 316). A client application on computing device can optionally display an alert to announce a change in status of the call history and/or missed call list (stage 318). An example of an alert that can be displayed is shown in FIG. 13.

Figure 7:
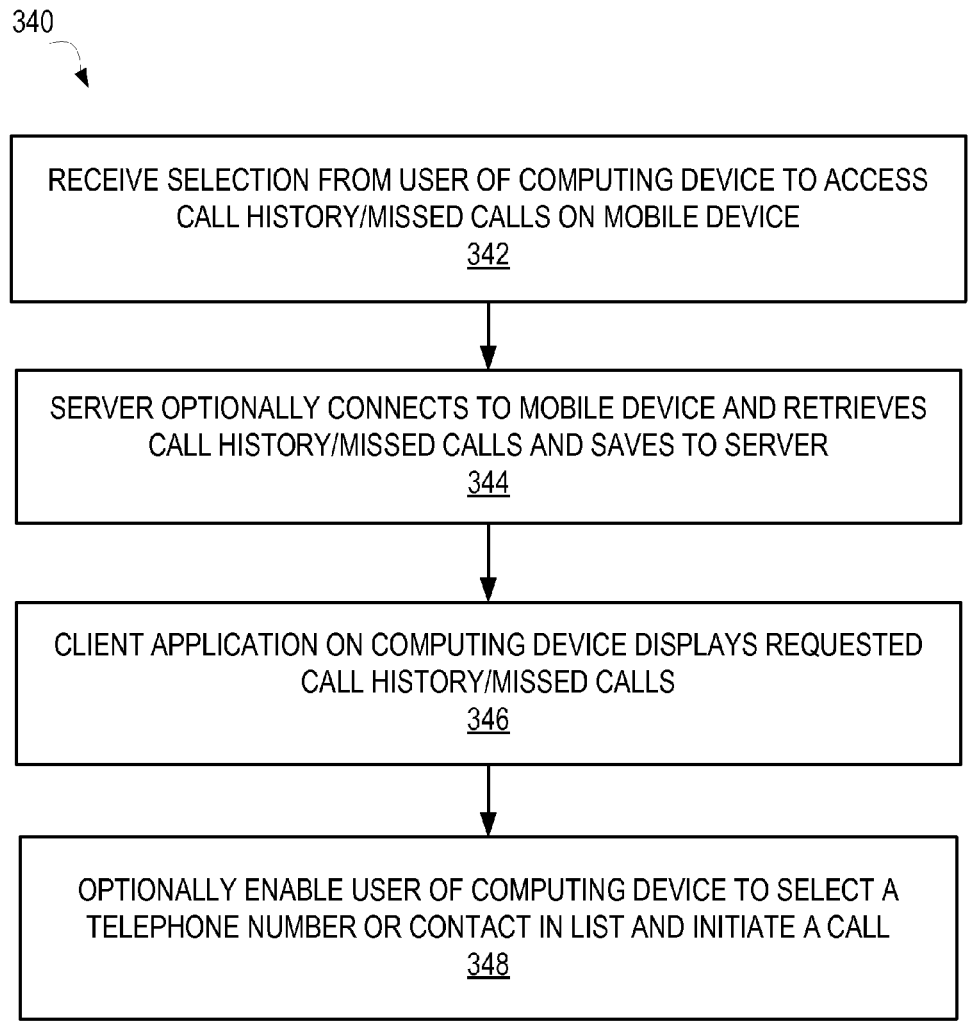
FIG. 7 is a process flow diagram for one implementation that illustrates the stages involved in enabling a user to access a call history and/or missed calls of a mobile device from a separate computing device.
Figure 11:
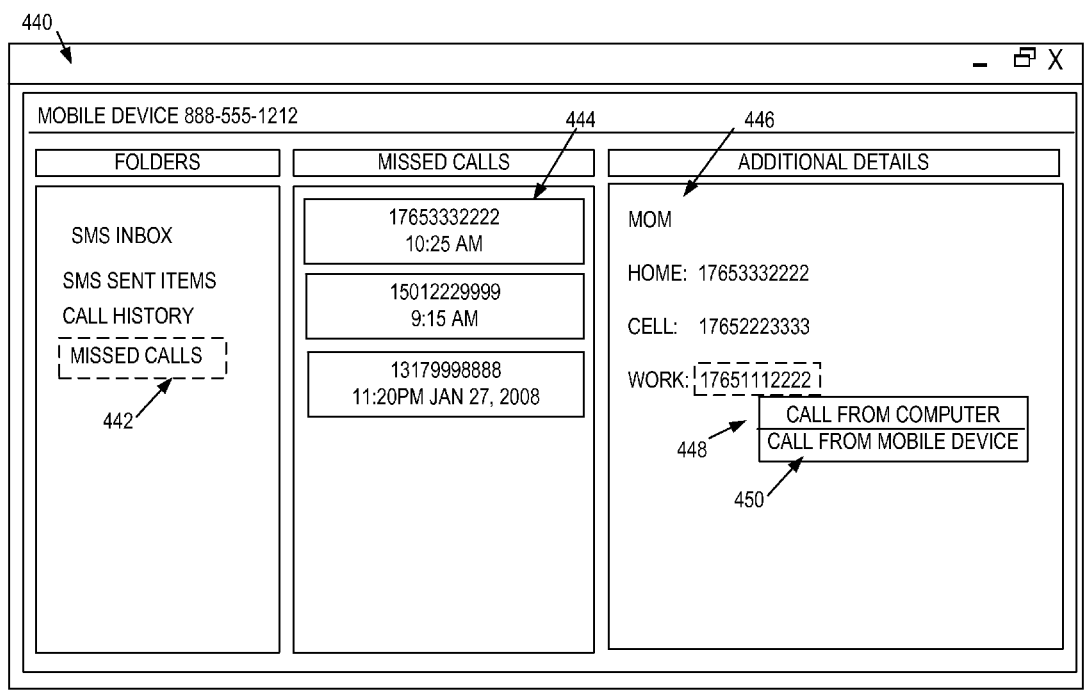
FIG. 11 is a simulated screen for one implementation that illustrates the viewing of missed calls for a mobile device from a separate computing device and optionally initiating a return call.

FIG. 7 is a process flow diagram 340 that illustrates one implementation of the stages involved in enabling a user to access a call history and/or missed calls of a mobile device from a separate computing device. A selection is received from a user of the computing device to access the call history and/or missed calls on the mobile device (stage 342). If the data has not recently been synchronized, the server can optionally connect to the mobile device to retrieve the call history and/or missed calls and save them to the data store of the server (stage 344). The call history that was saved in the data store of the server can be accessed so that the client application on the computing device can display the requested call history and/or missed calls to the user (stage 346). In one implementation, the user of the computing device can select a telephone number or contact in the list of mobile device calls displayed in the client application and initiate a call from the client application (stage 348). In such a scenario, the call could be initiated from a different phone or phone-enabled computer than the mobile device and/or from the mobile device itself through remote initiation from the computing device. An example of viewing a mobile device call history from a separate computing device and optionally selecting the number to dial in the call history is illustrated in FIG. 11.

Figure 8:
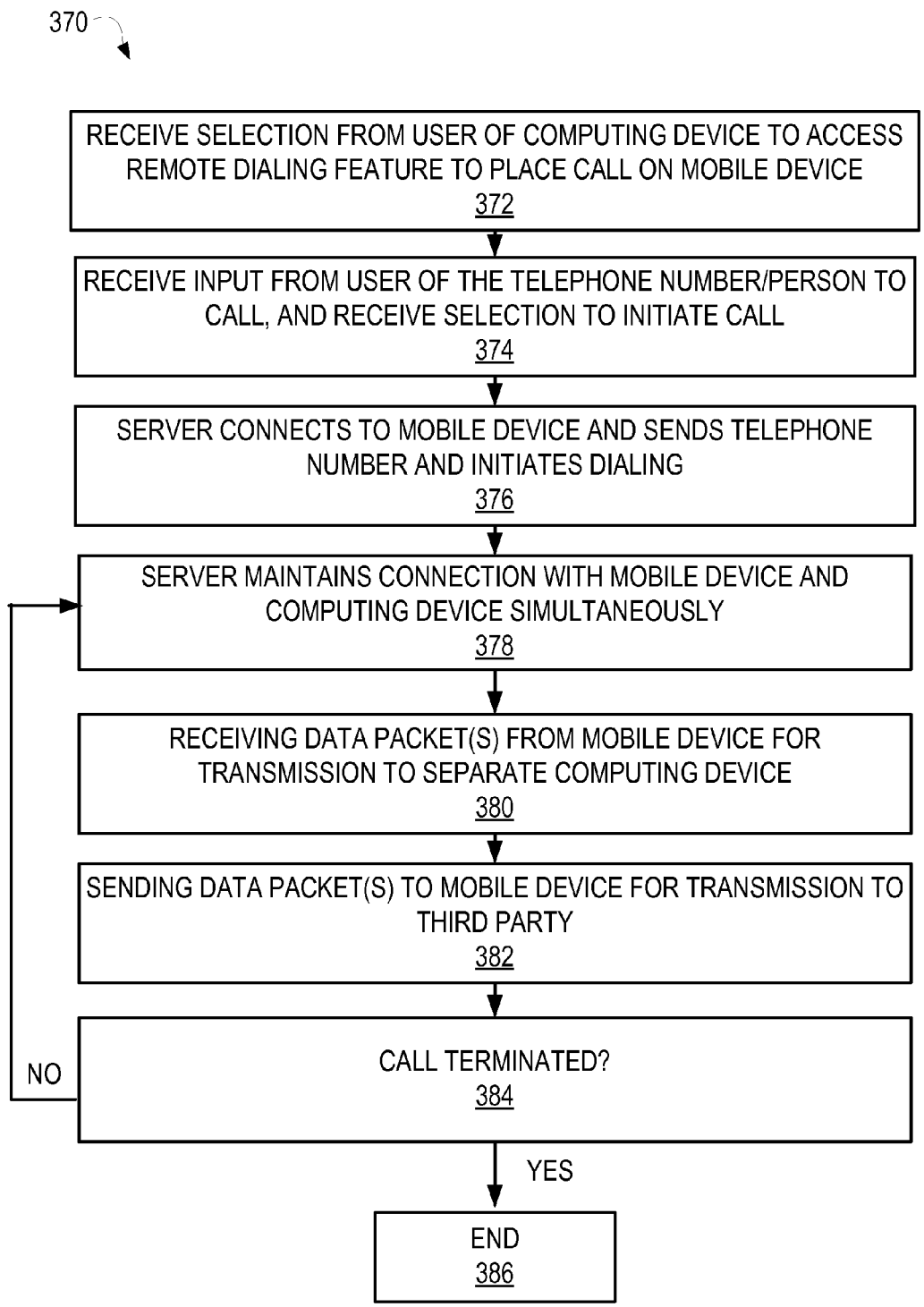
FIG. 8 is a process flow diagram for one implementation that illustrates the stages involved in enabling a user to initiate a telephone call from a computing device that is routed through a mobile device.

FIG. 8 is a process flow diagram 370 that illustrates one implementation of the stages involved in enabling a user to initiate a telephone call from a computing device that is routed through a mobile device. This feature can allow calls to be placed through a mobile device even from a user who is located separately from the mobile device, even out of the country. In other words, one possible usage of the feature described in this figure is for a user to travel abroad and place international calls from his/her mobile phone while leaving that phone plugged in at home. This could avoid international toll charges, yet allow the user to place calls that are dialed from his/her mobile device and have the caller ID of his/her mobile device.

To start with, a selection is received from a user of the computing device to access a remote dialing feature to place a call on the mobile device from a separate computing device (stage 372). Input is received from the user to select the telephone number and/or person to call, and a selection is received from the user to indicate that the user is ready to initiate the call (stage 374). For example, the user can type or select a number or person, and then click or otherwise select a dial option. The server then connects to the mobile device, sends the telephone number or other necessary information to the mobile device, and causes the mobile device to initiate the dialing (stage 376). The server maintains a connection with the mobile device and the computing device simultaneously (stage 378). One or more data packets are received from the mobile device and sent to the computing device so the user of the computing device can hear the response from the third party (stage 380). This is usually the greeting when the person answers the phone, such as "Hello", or "This is John speaking". The data packet(s) can be captured on the mobile device or by the server through the open communication connection.

The spoken voice from the user of the computing device is sent in one or more data packets to the mobile device so the third party can hear the communication from the user of the computing device (stage 382). The data packets can be created on the server, or captured on the computing device and transmitted to the server over the communication connection. It will be appreciated that no required order is intended to be conveyed in the ordering of data packets being sent and received. For example, in some scenarios, the first one or more data packets could come from the user of the computing device instead of the third party, such as when the third party has not said anything after answering the call, and the user of the computing device responds by saying, "Hello, is anyone there."

While the call is in process (decision point 384), the stages repeat with the server maintaining the connection (stage 378), and with the data packets on both sides being exchanged (stages 380 and 382). Once the call has terminated (decision point 384), then the process ends (stage 386). The remote call initiation process of FIG. 8 is shown in further detail in FIG. 12.

Turning now to FIGS. 9-12, simulated screens are shown to illustrate exemplary user interfaces for accessing mobile device information and/or features from a separate computing device. These screens can be displayed to users on output device(s) 511 (of FIG. 14). Furthermore, these screens can receive input from users from input device(s) 512 (of FIG. 14).

Figure 9:
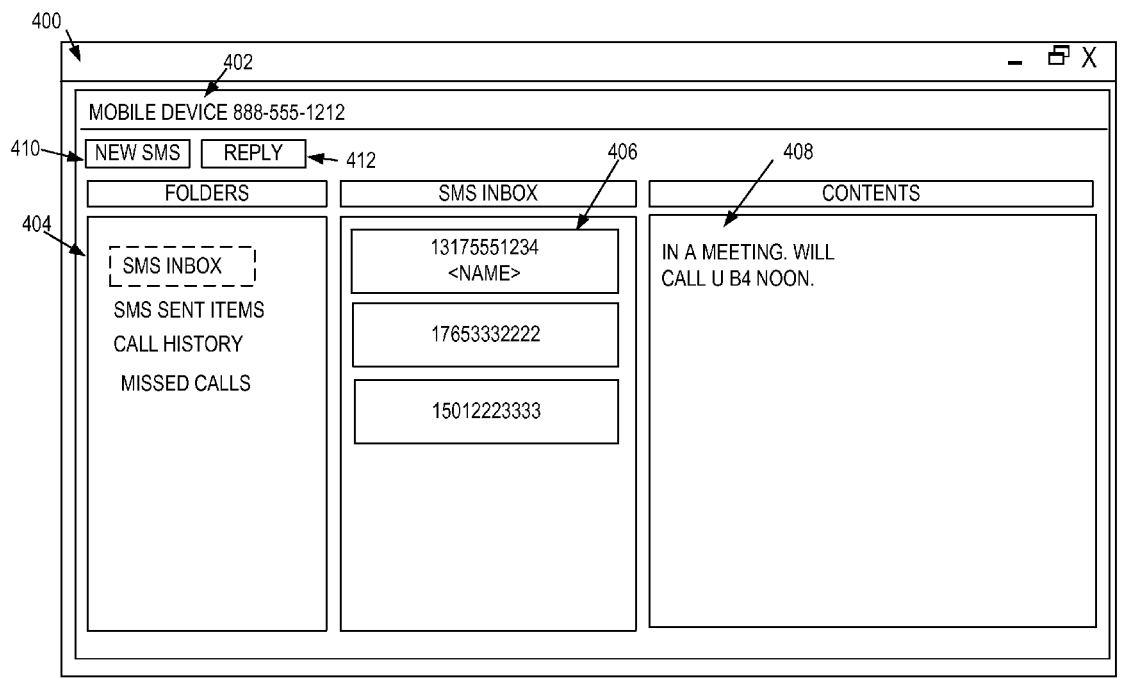
FIG. 9 is a simulated screen for one implementation that illustrates the viewing of mobile device information from a separate computing device.

FIG. 9 is a simulated screen 400 for one implementation that illustrates the viewing of mobile device information from a separate computing device. The phone number 402 of the mobile device to which the data corresponds is shown, along with other messaging information regarding that mobile device. For example, SMS inbox 404, SMS sent items, call history, and missed calls folders are displayed. Since SMS inbox 404 is selected, the messages 406 for the inbox 406 of the mobile device are displayed in further detail. In the example shown, details of the contents 408 of the selected message are also displayed for quick review. The user of the computing device is able to see the SMS messages and/or other mobile device communications information in further detail, and optionally take action upon those messages, such as by selecting a new SMS message option 410 to create a new SMS message, or a reply option 412 to reply to a selected SMS message. These features are discussed in further detail in FIG. 10.

Figure 10:
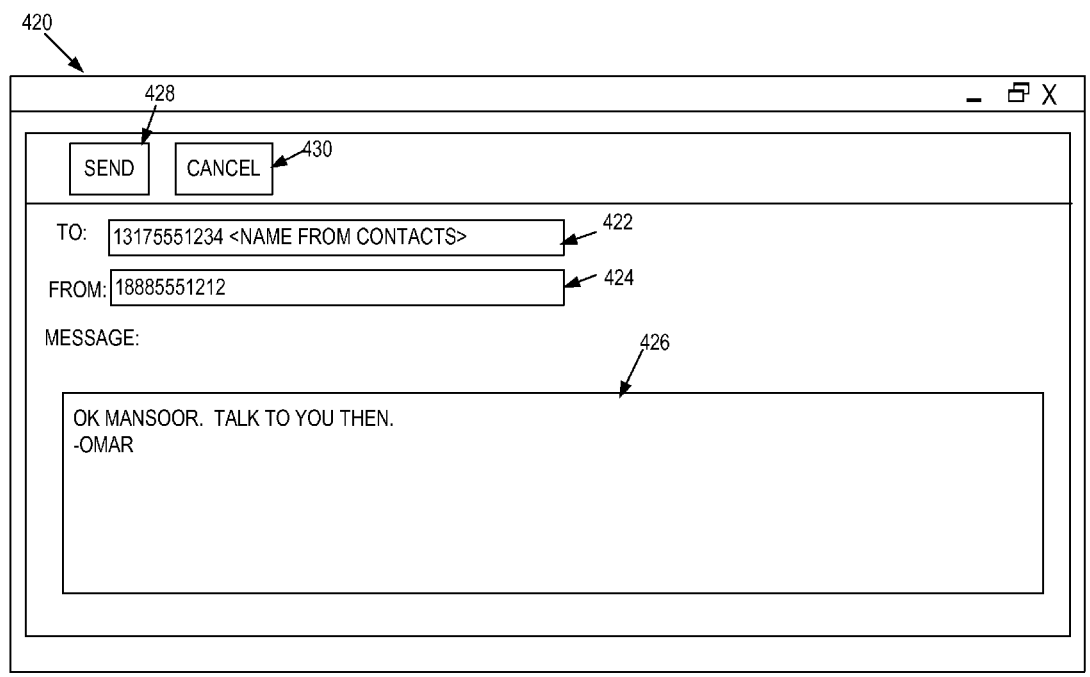
FIG. 10 is a simulated screen for one implementation that illustrates the initiation of the creation and sending of an SMS message for a mobile device from a separate computing device.

FIG. 10 is a simulated screen 420 for one implementation that illustrates the initiation of the creation and sending of an SMS message for a mobile device from a separate computing device. A screen similar to FIG. 10 can be shown when the user selects a new SMS message option or reply option as shown in FIG. 9. The user can fill in the mobile device details to which this particular SMS message should be sent. For example, the TO: field 422, FROM: field 424, and message body 426 can be entered by the user and/or programmatically. For example, the TO: field 422 can be entered manually by the user, or selected from a user's contacts list and then added programmatically. The FROM: field 424 can be filled in programmatically from the user's mobile phone account settings, or manually entered by the user having proper authority to use that mobile device's number. The message that the user wants to send can be entered in the message body 426. Once the message is ready to be sent, the user can select the send option 428, and the process described in FIG. 4 for sending the message down to the outbox of the mobile device is initiated.

FIG. 11 is a simulated screen 440 for one implementation that illustrates the viewing of missed calls for a mobile device from a separate computing device and optionally initiating a return call. In this example, the user has selected the missed calls folder 442, is viewing the missed calls list 444 from the particular mobile device. Additional details 446 about the currently selected missed call can also be displayed, and/or additional information about that call that may or may not have been included in the missed calls list from the mobile device. In the example in FIG. 11, additional contact details are shown that were pulled from a contact record for the person whose call was missed. Additional options can also be provided for the missed calls and/or call history and related details, such as to call the person back. In the example shown in FIG. 11, two options are displayed for calling the person back. One option 448 displayed is for initiating the call from the current computing device using a phone (such as a Voice-Over-IP phone) coupled to the current computing device (other than the mobile device). The other option 450 displayed is for initiating the call from the mobile device using the current computing device as the starting point. The latter process was described in detail in FIG. 8.

Figure 12:
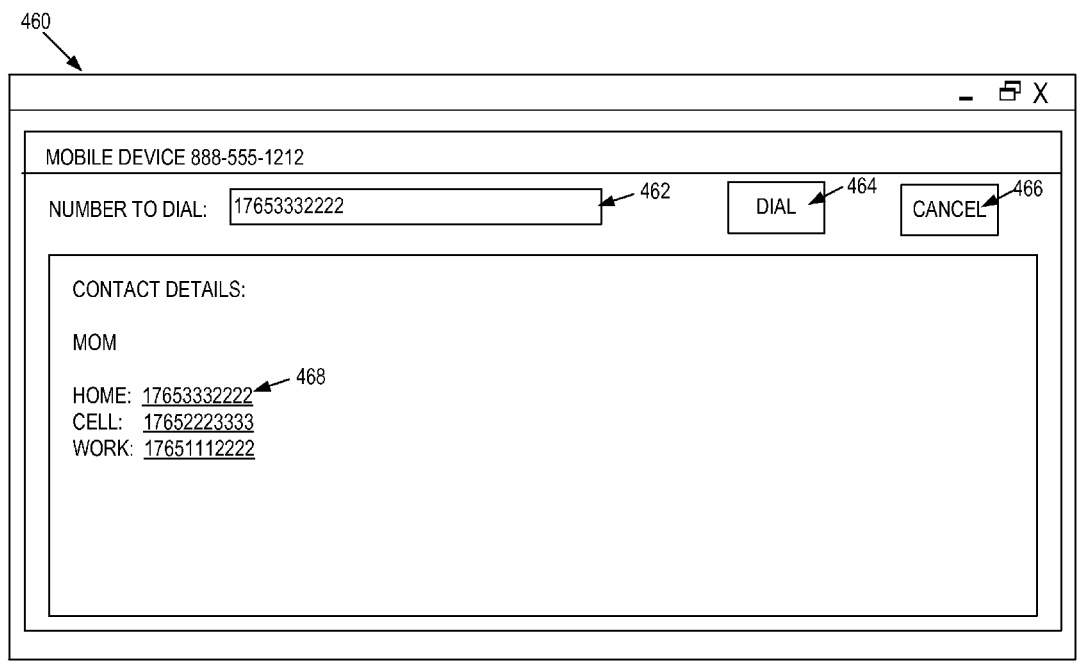
FIG. 12 is a simulated screen for one implementation that illustrates the initiation of a call from a separate computing device that will be dialed from and routed through a mobile device.

Similarly, FIG. 12 is a simulated screen 460 for one implementation that illustrates the initiation of a call from a separate computing device that will be dialed from and routed through a mobile device. In this example, a contact detail record is shown for a selected contact. One of the phone numbers of that contact can be selected, such as the home number 468 shown for mom. A number to dial can also be entered automatically into the number to dial field 462. If the user wants to cancel out of making the call, then the cancel option 466 can be selected. Once a phone number has been entered or otherwise selected, the dial option 464 can be initiated to start the call through the mobile device. The process described in detail in FIG. 8 for converting data packets between the mobile device and the computing device is then followed for processing the call.

FIG. 13 is a simulated screen 480 for one implementation that illustrates the displaying of an alert to the user in whatever program they are working in to indicate that a new message has arrived on the mobile device. In the example shown, the alert message 482 indicates that a new SMS message has arrived on the mobile device. In one implementation, the user can select the alert message 482 and be directly taken to the server-side inbox that has a copy of the new message. In another implementation, the user can manually open a separate program that allows access to the server-side inbox.

Figure 14:
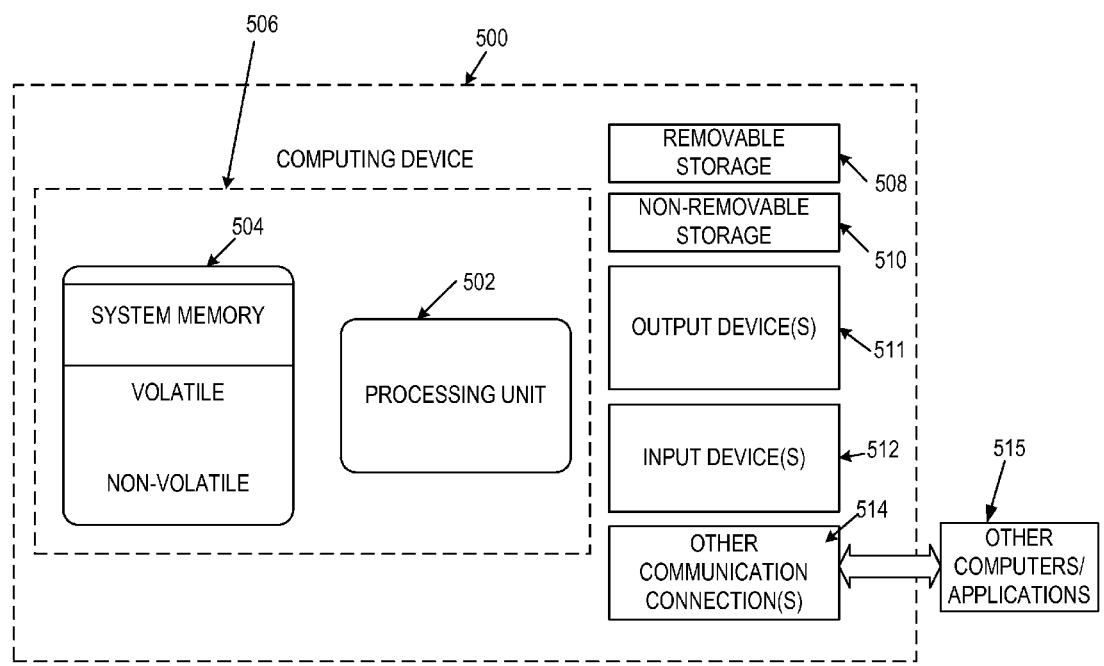
FIG. 14 is a diagrammatic view of a computer system of one implementation.

As shown in FIG. 14, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 14 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 14 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here. In one implementation, computing device 500 includes some or all of the components of mobile device communication system 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computing device comprising:
one or more processors;
one or more computer-readable media storing instructions that, when executed via the one or more processors, implement a client application to perform actions to remotely operate a mobile device including:
accessing communication information corresponding to the mobile device from a network accessible data server configured to remotely store the communication information and synchronize the communication information with the mobile device, the synchronized communication information including information regarding electronic messages and calls associated with the mobile device;
configuring a user interface for the client application to present the communication information and one or more options selectable to perform actions related to the communication information through the mobile device;
obtaining, via the user interface, a selection of at least one of the one or more options to perform selected actions; and
communicating the selection to the network accessible data service to initiate performance of the selected actions by the mobile device under the direction of the network accessible data server.

2. The computing device of claim 1, wherein the communication information includes one or more text messages sent to the mobile device.

3. The computing device of claim 1, wherein the one or more options selectable to perform actions include an option to create a text message on the computing device and send the text message through the mobile device.

4. The computing device of claim 1, wherein the client application comprises a communications and information management program configured to provide the user interface to present the communication information and expose the one or more options selectable to perform actions related to the communication information.

5. The computing device of claim 1, wherein the communication information includes a call history of one or more calls on the mobile device including at least a list of one or more missed calls on the mobile device.

6. The computing device of claim 1, wherein the one or more options selectable to perform actions include an option to place a call from the computing device through the mobile device.

7. The computing device of claim 1, wherein the client application is further configured to perform actions including:
outputting an alert message for display by the computing device regarding a communication directed to the mobile device responsive to receipt of the communication by the mobile device.

8. The computing device of claim 1, wherein configuring the user interface comprises configuring the user interface to include:
a portion having a list of types of the communication information for the mobile device accessible via the user interface;
a portion to display messages for a selected one of the listed types of the communication information;
a portion to show message details for review of a selected one of the displayed messages; and
selectable options to:
view a messaging inbox for the mobile device and initiate creation of a reply message for a selected message in the messaging inbox to send through the mobile device; and
view a call list for the mobile device and initiate a return call that is routed through the mobile device for a selected call in the call list.

9. A computing system comprising:
a component connectable to a display device to output information for display on the display device;
one or more computer-readable media storing instructions that, when executed by the computing system, expose a user interface configured to facilitate remote operation of a mobile device physically located in a remote location from the computing system, the user interface including:
a portion having a list of types of communication information for the mobile device accessible via the user interface, the communication information synchronized with a network accessible data server and including information regarding electronic messages and calls associated with the mobile device;
a portion to display messages for a selected one of the listed types of communication information;
a portion to show message details for review of a selected one of the displayed messages; and
selectable options to expose a messaging list for the mobile device and expose a call list for the mobile device.

10. The computing system of claim 9, wherein the user interface further includes a message creation option selectable to expose a message creation screen configured to enable creation of a message to send through the mobile device.

11. The computing system of claim 10, wherein the user interface further includes a call option selectable to expose a call initiation screen configured to enable initiation of a call that is routed through the mobile device.

12. The computing system of claim 9, wherein the call list comprises at least one of a call history or a missed call list for the mobile device.

13. The computing system of claim 9, wherein the messaging list comprises at least one of a text messaging inbox or an email inbox for the mobile device.

14. The computing system of claim 9, wherein the list of types of communication information comprises items for a text message inbox, a text message outbox, a call history, and missed calls associated with the mobile device.

15. The computing system of claim 9, wherein the user interface is configured to facilitate remote operation of a mobile device over a network through interaction with the network accessible data server that synchronizes the communication information with the mobile device, provides the communication information to the computing system for presentation via the user interface, and directs operation of the mobile device in accordance with one or more selected actions selected via the user interface to cause performance of the selected actions by the mobile device.

16. The computing system of claim 9, wherein the user interface is further configured to display alert messages indicative of new messages that are received by the mobile device in the remote location.

17. A method implemented by a computing system comprising:
synchronizing communication information corresponding to a mobile device between the mobile device and an online data store;
sending the synchronized communication information from the online data store to a client for display by a personal information management application of the client configured to enable remote operation of the mobile device by selection of one or more actions related to the communication information that are performable by the mobile device;
receiving a selection from the client of one or more of the actions to initiate performance of selected actions by the mobile device; and
communicating with the mobile device to cause performance of the selected actions related to the communication information by the mobile device.

18. The method of claim 17, wherein the synchronized communication information comprises electronic messages associated with the mobile device.

19. The method of claim 17, wherein the synchronized communication information comprises information regarding telephone calls placed and received by the mobile device.

20. The method of claim 17, wherein the client to which the synchronized communication information is sent is located in a different country than a country in which the mobile device is physically located, the selected actions initiated from the different country by the client for performance by the mobile device in the country in which the mobile device is physically located.

* * * * *